US010421691B2

(12) United States Patent
Izumi et al.

(10) Patent No.: US 10,421,691 B2
(45) Date of Patent: *Sep. 24, 2019

(54) JOINED BODY AND METHOD FOR PRODUCING THE SAME

(71) Applicant: NGK Insulators, Ltd., Nagoya (JP)

(72) Inventors: Yunie Izumi, Nisshin (JP); Yoshimasa Kobayashi, Nagoya (JP); Kenji Morimoto, Kasugai (JP); Shinji Kawasaki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 240 days.

This patent is subject to a terminal disclaimer.

(21) Appl. No.: 14/856,629

(22) Filed: Sep. 17, 2015

(65) Prior Publication Data

US 2016/0002110 A1    Jan. 7, 2016

Related U.S. Application Data

(63) Continuation of application No. PCT/JP2014/057486, filed on Mar. 19, 2014.

(30) Foreign Application Priority Data

Mar. 19, 2013    (JP) ................................ 2013-056631

(51) Int. Cl.

| | |
|---|---|
| C04B 37/00 | (2006.01) |
| C04B 37/02 | (2006.01) |
| C04B 35/111 | (2006.01) |
| C04B 35/12 | (2006.01) |
| C04B 35/565 | (2006.01) |
| C04B 35/573 | (2006.01) |
| C04B 38/00 | (2006.01) |
| C04B 35/01 | (2006.01) |
| C04B 35/26 | (2006.01) |
| C04B 35/45 | (2006.01) |
| B23K 20/16 | (2006.01) |
| B23K 20/22 | (2006.01) |
| B23K 35/26 | (2006.01) |
| B23K 35/28 | (2006.01) |
| B23K 35/32 | (2006.01) |
| B32B 3/12 | (2006.01) |
| B32B 7/04 | (2019.01) |
| B32B 9/00 | (2006.01) |
| B32B 15/04 | (2006.01) |
| B23K 103/08 | (2006.01) |
| B23K 103/14 | (2006.01) |
| B23K 103/18 | (2006.01) |
| B23K 103/00 | (2006.01) |
| B23K 103/16 | (2006.01) |
| B23K 103/02 | (2006.01) |
| B23K 103/12 | (2006.01) |

(52) U.S. Cl.
CPC ............ *C04B 37/026* (2013.01); *B23K 20/16* (2013.01); *B23K 20/22* (2013.01); *B23K 35/26* (2013.01); *B23K 35/262* (2013.01); *B23K 35/28* (2013.01); *B23K 35/32* (2013.01); *B23K 35/325* (2013.01); *B32B 3/12* (2013.01); *B32B 7/04* (2013.01); *B32B 9/005* (2013.01); *B32B 15/04* (2013.01); *C04B 35/01* (2013.01); *C04B 35/111* (2013.01); *C04B 35/12* (2013.01); *C04B 35/26* (2013.01); *C04B 35/45* (2013.01); *C04B 35/565* (2013.01); *C04B 35/573* (2013.01); *C04B 37/003* (2013.01); *C04B 37/005* (2013.01); *C04B 37/006* (2013.01); *C04B 37/023* (2013.01); *C04B 37/025* (2013.01); *C04B 38/0016* (2013.01); *B23K 2103/02* (2018.08); *B23K 2103/08* (2018.08); *B23K 2103/12* (2018.08); *B23K 2103/14* (2018.08); *B23K 2103/172* (2018.08); *B23K 2103/18* (2018.08); *B23K 2103/26* (2018.08); *B23K 2103/52* (2018.08); *B32B 2305/024* (2013.01); *C04B 2235/3227* (2013.01); *C04B 2237/06* (2013.01); *C04B 2237/123* (2013.01); *C04B 2237/124* (2013.01); *C04B 2237/34* (2013.01); *C04B 2237/343* (2013.01); *C04B 2237/365* (2013.01); *C04B 2237/597* (2013.01); *C04B 2237/61* (2013.01)

(58) Field of Classification Search
CPC .............. B32B 9/005; B32B 2307/202; C04B 2237/06; C04B 37/00
See application file for complete search history.

(56) References Cited

U.S. PATENT DOCUMENTS

| 4,523,554 A | 6/1985 | Ryu | |
|---|---|---|---|
| 4,629,662 A * | 12/1986 | Brownlow | ............. C03C 17/36 |
| | | | 204/192.15 |

(Continued)

FOREIGN PATENT DOCUMENTS

| EP | 1 493 516 A1 | 1/2005 |
|---|---|---|
| GB | 884004 A | 12/1961 |

(Continued)

OTHER PUBLICATIONS

International Preliminary Report on Patentability, International Application No. PCT/JP2014/057486, dated Oct. 1, 2015 (12 pages).

(Continued)

*Primary Examiner* — Gregory Listvoyb
(74) *Attorney, Agent, or Firm* — Burr & Brown, PLLC

(57) ABSTRACT

A joined body 20 according to the present invention includes a first member 22 made of a porous ceramic, a second member 24 made of a metal, and a joint 30 formed of an oxide ceramic of a transition metal, the joint 30 joining the first member 22 to the second member 24. Alternatively, a joined body may include a first member made of a dense material, a second member made of a dense material, and a joint formed of an oxide ceramic of a transition metal, the joint joining the first member to the second member.

10 Claims, 11 Drawing Sheets

(56) References Cited

U.S. PATENT DOCUMENTS

| | | | |
|---|---|---|---|
| 6,086,990 | A | 7/2000 | Sumino et al. |
| 6,413,589 | B1 * | 7/2002 | Li .................... B22F 1/025 |
| | | | 427/193 |
| 7,017,795 | B2 * | 3/2006 | Liu .................... B23K 35/025 |
| | | | 228/248.1 |
| 2003/0132270 | A1 | 7/2003 | Weil et al. |
| 2009/0169848 | A1 * | 7/2009 | Komiyama .......... C04B 28/24 |
| | | | 428/219 |
| 2010/0193104 | A1 | 8/2010 | Ryu et al. |
| 2010/0196795 | A1 | 8/2010 | Ohmori et al. |
| 2011/0052916 | A1 | 3/2011 | Ohmori et al. |
| 2011/0111324 | A1 * | 5/2011 | Ohmori .............. H01M 8/0282 |
| | | | 429/495 |

FOREIGN PATENT DOCUMENTS

| | | |
|---|---|---|
| JP | 56-48463 B2 | 11/1981 |
| JP | 61-11907 B2 | 4/1986 |
| JP | 62-4357 B2 | 1/1987 |
| JP | 63-51993 B2 | 10/1988 |
| JP | 05-194052 A1 | 8/1993 |
| JP | 05-286776 A1 | 11/1993 |
| JP | 06-001670 A1 | 1/1994 |
| JP | 2003-049208 A1 | 2/2003 |
| JP | 2011-065975 A1 | 3/2011 |
| JP | 2011-108621 A1 | 6/2011 |
| JP | 2011-246340 A1 | 12/2011 |

OTHER PUBLICATIONS

U.S. Appl. No. 14/848,938, filed Sep. 9, 2015, Izumi, et al.
U.S. Appl. No. 14/873,311, filed Oct. 2, 2015, Izumi, et al.
U.S. Appl. No. 14/873,327, filed Oct. 2, 2015, Izumi, et al.
U.S. Appl. No. 14/873,263, filed Oct. 2, 2015, Izumi, et al.
U.S. Appl. No. 14/873,291, filed Oct. 2, 2015, Izumi, et al.
Extended European Search Report (Application No. 14770113.0) dated Oct. 7, 2016.
Japanese Patent Publication Nos. 2011-246340 A1 (Ref. AE), 06-001670 A1 (Ref. AF) and 05-194052 A1 (Ref. AG) are discussed at paragraphs [0002] and [0004] of the present specification.
Japanese Patent Publication No. 2011-065975 A1 (Ref. AH) corresponds to U.S. Patent Application Publication Nos. 2010/0196795 A1 (Ref. AA) and 2010/0193104 A1 (Ref. AB).
Japanese Patent Publication No. 61-11907 B2 (Ref. AI) corresponds to U.S. Pat. No. 4,523,554 (Ref. AC).
Japanese Patent Publication No. 2011-108621 A1 (Ref. AL) corresponds to U.S. Patent Application Publication No. 2011/0052916 A1 (Ref. AD).
International Search Report and Written Opinion (Application No. PCT/JP2014/057486) dated Jun. 10, 2014.

* cited by examiner

Measurement lines

50 μm

JOINED BODY AND METHOD FOR PRODUCING THE SAME

BACKGROUND OF THE INVENTION

1. Field of the Invention

The present invention relates to a joined body and a method for producing the joined body.

2. Description of the Related Art

A joined body that includes a pair of electrodes, which are formed of a metal layer, on a surface of a porous ceramic honeycomb body is proposed (see, for example, Patent Literature 1). In this joined body, the metal layers contain Cr and Fe, and a diffusion layer formed of a metal silicide is disposed within a boundary between the honeycomb body and the metal layers and ensures reliability of an electrical junction in high-temperature environments. A joined body that includes a ceramic member and a metal member joined together with a buffer layer is proposed (see, for example, Patent Literature 2). The ceramic member is a silicon nitride sintered body. The buffer layer in the joined body includes a silicon nitride sintered body layer containing 5% to 20% by mass of active metal nitride, a metal layer having a low Young's modulus composed of a transition metal and an alloy thereof, and a silicon nitride sintered body layer containing 25% to 70% by mass of active metal nitride disposed in this order. A joined body that includes a non-oxide ceramic and a metal joined together with brazing filler is proposed (see, for example, Patent Literature 3). In the brazing filler, V is added to an inactive metallic material. In this joined body, joining is performed by heating the brazing filler at a temperature in the range of 1000° C. to 1200° C.

CITATION LIST

Patent Literature

PTL 1: Japanese Unexamined Patent Application Publication No. 2011-246340

PTL 2: Japanese Unexamined Patent Application Publication No. 6-1670

PTL 3: Japanese Unexamined Patent Application Publication No. 5-194052

SUMMARY OF THE INVENTION

However, because the joined bodies described in Patent Literature 1 and Patent Literature 2 have a metallic joining layer, the joined bodies have problems of low heat resistance, low oxidation resistance, and low joining reliability. In Patent Literature 3, performing joining with the brazing filler may be unstable at high temperatures in the air. The high firing temperature is also problematic. Thus, there is a demand for more simple and more reliable joining of members.

In view of such problems, it is a principal objective of the present invention to provide a joined body that can be produced by more simply and more reliably joining two members together and a method for producing the joined body.

Solution to Problem

On the basis of extensive studies to achieve the principal objective, the present inventors completed the present invention by finding that a ceramic member and a metal member, a ceramic member and a ceramic member, or a metal member and a metal member can be more simply and more reliably joined together with an oxide ceramic of a metal oxide.

A joined body according to the present invention is a joined body that includes
 a first member,
 a second member, and
 a joint formed of an oxide ceramic containing at least one of transition metals, the joint joining the first member to the second member.

A method for producing a joined body according to the present invention is
 a method for producing a joined body including a first member and a second member joined together, the method including
 a joining step of forming a joint for joining the first member to the second member with an oxide ceramic, the oxide ceramic being formed by forming a multilayer body comprising the first member, the second member and a metal raw material interposed therebetween and by firing the multilayer body in the air in a temperature range lower than the melting point of an oxide of the metal raw material, the oxide ceramic being produced by oxidation of the metal raw material.

Advantageous Effects of Invention

The present invention can more simply and more reliably join two members. The following is a plausible reason for this. For example, the joint is the oxide ceramic and is therefore stable at high temperatures and in oxygen atmospheres. Because the raw material of the joint is a relatively reactive metal raw material, the raw material can relatively easily react with a member, incorporate a component of the member, and allow the joint to be bonded to the member while the component is diffused therein. It is supposed that when fired in the air, the raw material becomes less reactive through oxidation of the metal, thereby preventing the incorporated component of the member from excessively diffusing into the joint. When the member to be joined is a porous ceramic, a relatively dense oxide ceramic penetrates into the pores of the porous ceramic and strongly combines a joining layer with the porous ceramic. Thus, it is surmised that two members can be more simply and more reliably joined together.

DESCRIPTION OF THE PREFERRED EMBODIMENTS

Figure 1:
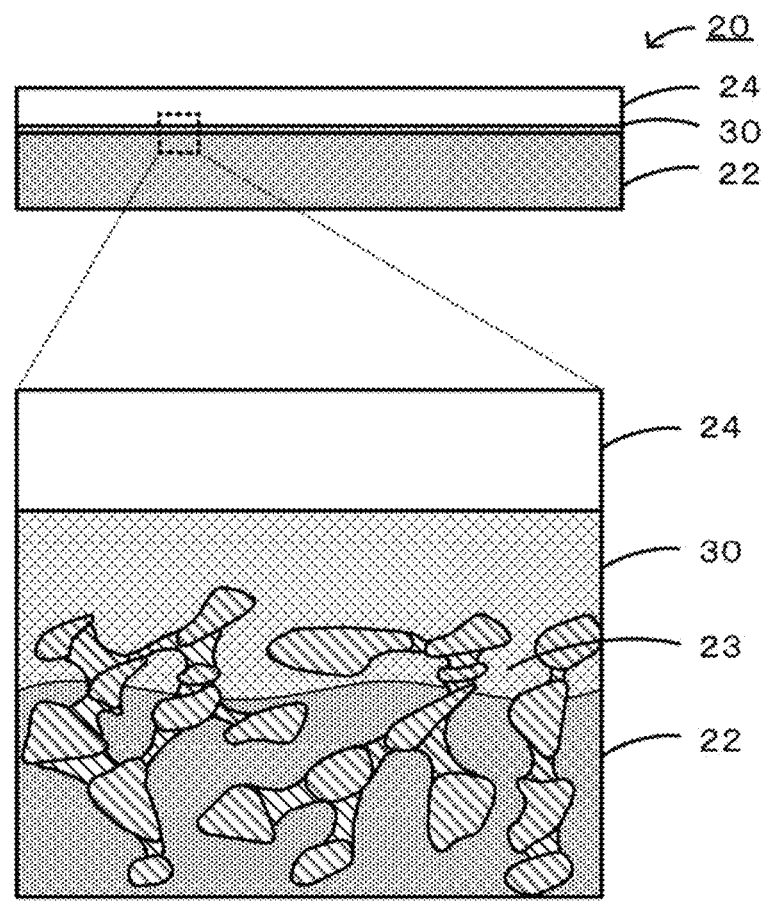
FIG. 1 is a schematic explanatory view of the structure of a joined body 20 according to an embodiment of the present invention.
Figure 2:
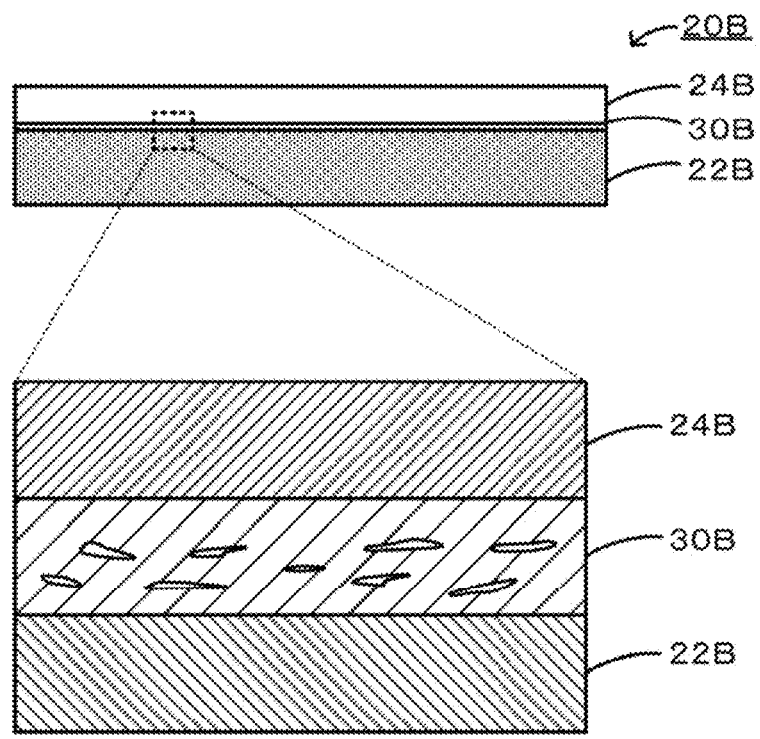
FIG. 2 is a schematic explanatory view of the structure of a joined body 20B.
Figure 3:
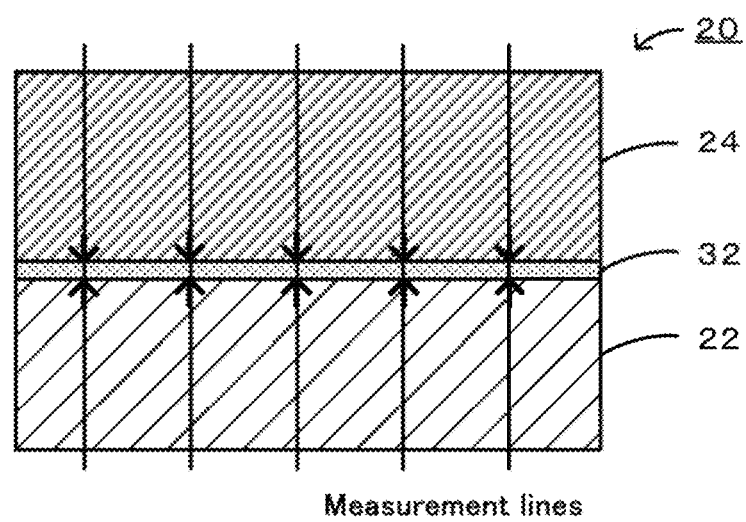
FIG. 3 is an explanatory view of the measurement of the thickness of a reaction layer.

Embodiments of the present invention will be described below with reference to the accompanying drawings. FIG. 1 is a schematic explanatory view of the structure of a joined body 20 according to an embodiment of the present invention. FIG. 2 is a schematic explanatory view of the structure of a joined body 20B. FIG. 3 is an explanatory view of the measurement of the thickness of a reaction layer. As illustrated in FIG. 1, a joined body 20 according to the present invention includes a first member 22 made of a porous ceramic, a second member 24 made of a metal, and a joint 30 formed of an oxide ceramic of a transition metal, the joint 30 joining the first member 22 to the second member 24. Alternatively, as illustrated in FIG. 2, a joined body 20B according to the present invention may include a first member 22B made of a dense material, a second member 24B made of a dense material, and a joint 30B formed of an oxide ceramic of a transition metal, the joint 30B joining the first member 22B to the second member 24B. Thus, the first member and the second member may be a porous material or a dense material. The joined body may include a porous material and a porous material joined together, a porous material and a dense material joined together, or a dense material and a dense material joined together. A joined body according to the present embodiment will be described below.

The first member or second member to be joined may be a porous ceramic. The porous ceramic may be any porous ceramic. The term "porous", as used herein, means that there are open pores on the surface. For example, the porosity may be 10% or more by volume, preferably 20% or more by volume, more preferably 40% or more by volume. The porosity is preferably 90% or less by volume in terms of simplicity of production. The porosity of the porous ceramic can be appropriately determined for each use. The porous ceramic preferably has an average pore size in the range of 1 to 300 μm, for example. In this range, oxide ceramic can easily penetrate into the pores of the porous ceramic and provide strong joining. The average pore size is more preferably 5 μm or more, still more preferably 10 μm or more. The average pore size is more preferably 100 μm or less, still more preferably 50 μm or less. The porosity and the average pore size of the porous ceramic are measured by a mercury intrusion method.

For example, the porous ceramic may contain at least one inorganic material selected from carbides, such as silicon carbide, titanium carbide, zirconium carbide, and boron carbide, nitrides, such as silicon nitride, aluminum nitride, titanium nitride, and zirconium nitride, oxynitrides, such as sialon, silicides, such as molybdenum silicide, and zirconium phosphate. For example, the porous ceramic may contain at least one inorganic material selected from cordierite, mullite, zeolite, aluminum titanate, aluminum oxide, zirconium oxide, titanium oxide, silicon oxide, and magnesium oxide. The shape of the porous ceramic is not particularly limited and may be determined for each use, for example, plate-like, cylindrical, or honeycomb, or may be of a structure through which a fluid can flow. More specifically, the porous ceramic is preferably a honeycomb structure having partitions forming a plurality of cells serving as a fluid flow path. The porous ceramic may be electrically conductive when the metal member is an electrode. The term "electrically conductive", as used herein, refers to an electric resistivity of less than $10^5$ Ωcm. The term "electrically non-conductive", as used herein, refers to an electric resistivity of $10^6$ Ωcm or more. In this case, the porous ceramic is preferably a composite material containing SiC and Si for bonding SiC, the SiC and the Si forming pores. Si-bonded SiC ceramics are sometimes joined to a metal member serving as an electrode in order to provide electric conductivity. Thus, the application of the present invention has great significance.

The first member or second member to be joined may be a dense material. The dense material may be any dense member having a low porosity, for example, a metal member or dense ceramic. For example, the dense material may have a porosity of 5% or less by volume, preferably 1% or less by volume, more preferably 0.5% or less by volume. The metal member may be made of any metal, such as a typical metal or transition metal, and is preferably electrically conductive, for example. The transition metal is preferably a metal such as Fe, Co, Ni, or Cu or an alloy thereof. Depending on the use, a noble metal, such as Pt or Au, may be used. The metal member may be an electrode. In this case, stainless steel, such as a Cr—Ni—Fe alloy (SUS 304) or Cr—Fe alloy (SUS 430), is suitably used. The metal member is preferably an alloy containing at least Fe and Cr and is more preferably an alloy in which Fe constitutes 70% or more by mass and less than 90% by mass and Cr constitutes 10% or more by mass and less than 30% by mass. This is because of their stable material quality and high electrical conductivity. The metal member may have any shape, such as plate-like, depending on the use. For example, the dense ceramic may be produced by densely sintering any of the materials for the porous ceramic described above, or may be a member produced by filling pores of a porous ceramic with a filler or impregnating material, or may be a composite oxide member containing multiple types of metals. More specifically, the filled member may be a Si-impregnated SiC sintered body produced by filling pores of porous SiC with metallic Si. Such a material has high thermal conductivity and has high electrical conductivity due to metallic Si. For example, the composite oxide member may be an electrically conductive ceramic material, such as a $LaCrO_3$-based material, a $BaTiO_3$-based material, a $LaMnO_3$-based material, a $LaCoO_3$-based material, a $NaCo_2O_4$-based material, a $Ca_3Co_4O_9$-based material, a $LaNiO_3$-based material, or a $SrTiO_2$-based material. The "based material" is intended to include materials partly substituted with an alkali metal element, an alkaline-earth metal, and an element having a different valence, for example. More specifically, the $LaMnO_3$-based material includes $(La_{0.9}Sr_{0.1})MnO_3$.

A joint according to the present invention is formed of an oxide ceramic containing at least one of transition metals and joins a first member to a second member. For joining of an electrically conductive first member and an electrically conductive second member, a transition metal oxide is suitable for the joint because of its electrical conductivity. For example, the transition metal is preferably at least one selected from Fe, Co, Ni, Mn, Cu, Ti, V, Zr, Nb, Mo, Ta, and W, more preferably Fe, Ni, Mn, and/or Cu. For example, the oxide ceramic may be at least one of $Fe_2O_3$, NiO, $MnO_2$, and CuO. Depending on the use, the oxide ceramic may be electrically conductive or electrically non-conductive. For example, when the first member is merely fixed to the second member, the oxide ceramic may be electrically non-conductive. For joining of an electrically conductive first member and an electrically conductive second member, the oxide ceramic should be electrically conductive. A joint according to the present invention may be an oxide ceramic that is disposed between a porous ceramic first member and a second member, penetrates into the pores of the porous ceramic, and joins the porous ceramic to the second member. A structure in which such an oxide ceramic penetrates into the pores of the porous ceramic is preferred in terms of high joining strength.

In a joint according to the present invention, the thickness of a reaction layer at the interface between the first member or second member and the oxide ceramic is preferably 3.0 µm or less, more preferably 1.0 µm or less, still more preferably 0.1 µm or less. In joining treatment of joining the first member to the second member with a joint, heating may cause the first member and/or the second member to react with an oxide ceramic, thus forming a composite phase. A reaction layer containing such a composite phase is preferably minimized and more preferably does not exist. A method for measuring the thickness of the reaction layer will be described below. FIG. 3 is an explanatory view of the measurement of the thickness of a reaction layer 32. The thickness of the reaction layer 32 at the interface between the first member 22 and the joint 30 or at the interface between the second member 24 and the joint 30 is measured in an image taken in electron microscope (SEM) observation. More specifically, a cross section of the joined body 20 is observed with SEM-EDX at a magnification of 3000. Then, perpendicular lines (measurement lines) that are perpendicular to the interface in the image and divide the interface into five equal parts are drawn. The length between the points of intersection between the lower end and the upper end of the reaction layer 30 at the interface and each of the measurement lines are measured. The five lengths are averaged to determine the thickness of the reaction layer.

A joint according to the present invention preferably has a porosity of 70% or less by volume, more preferably 55% or less by volume, still more preferably 30% or less by volume. The oxide ceramic is still more preferably a dense body in terms of joining strength. The joint preferably has a porosity of 5% or more by volume, more preferably 10% or more by volume, still more preferably 20% or more by volume. The oxide ceramic preferably has pores in terms of stress relaxation. The porosity of the oxide ceramic is calculated by the following method. The porosity of the oxide ceramic is determined by image analysis of a microstructure photograph image taken with a SEM as described above using image analysis software. First, a portion of the oxide ceramic having an area of $0.5 \times 10^{-6}$ $m^2$ in the joint is chosen and is subjected to binarization treatment to distinguish the pore images from the oxide ceramic image. The conditions for the binarization treatment are appropriately determined for each image and may be empirically determined. In the image subjected to the binarization treatment, the oxide ceramic is separated from the pores, and their area ratio is calculated as the porosity. The area ratio in the cross section is assumed to correspond substantially to the volume ratio and is considered to be the porosity (% by volume).

A joint according to the present invention may be formed using a pore-forming material. The pore-forming material can preferably be eliminated by treatment. For example, the pore-forming material may be at least one selected from the group consisting of carbon black, coke, starch, refined rice flour, natural resins, and synthetic resins, which can be burned by heat treatment. For example, the amount of pore-forming material in the joint is preferably 10% or more by volume, more preferably 20% or more by volume. The pore-forming material preferably constitutes 10% or more by volume because this promotes stress relaxation in the joint. The amount of pore-forming material in the joint is preferably 50% or less by volume, more preferably 30% or less by volume. The pore-forming material preferably constitutes 50% or less by volume because this can further suppress a decrease in mechanical strength in the joint. The amount of pore-forming material in the joint is preferably appropriately determined on the basis of the relationship between the degree of stress relaxation and mechanical strength in the joint.

In a joint according to the present invention, the oxide ceramic preferably has a volume change ratio Y/X of 0.7 or more. The volume change ratio Y/X is the ratio of the volume Y after oxidation to the volume X before the oxidation. The volume change ratio Y/X is more preferably 1.3 or more, still more preferably 1.6 or more. For example, for joining of a porous ceramic, a higher volume change ratio is preferred because the oxide ceramic more easily penetrates into the pores of the porous ceramic due to oxidative expansion. For example, the volume change ratio Y/X is 2.14 for $Fe_2O_3/Fe$, 1.77 for CuO/Cu, 2.22 for $Mn_2O_3/Mn$, 1.62 for NiO/Ni, 0.79 for MgO/Mg, and 1.28 for $Al_2O_3/Al$.

In a joint according to the present invention, the oxide ceramic preferably contains a second component in addition to a first component. The first component is a main component and is a metal. The second component is a metallic element. The joint preferably contains the second component because a solid solution of the second component in the oxide of the first component of the oxide ceramic (also referred to as a main oxide) can provide additional electrical conductivity and further suppress a decrease in electrical conductivity under heating. The joint preferably contains the second component also because this can further reduce the electrical resistance of the joint and suppress heat generation. For example, the second component is preferably a metallic element having a different valence from the first component of the oxide ceramic, or may be the same metal as the first component, or may be a different metal from the first component. For example, the second component is preferably at least one element of Li, Na, K, Ga, Si, Zr, Ti, Sn, Nb, Sb, and Ta. For example, the joint may be formed by adding a compound containing the second component (also referred to as a second compound) to a raw material containing the first component. The second compound may be a conductive aid. The second compound may be a carbonate, oxide, hydroxide, chloride, or nitrate, or may be a carbonate or oxide. For example, the second component content is preferably 0.2 mol % or more, more preferably 0.5 mol % or more, still more preferably 1.0 mol % or more, based on the number of moles of the elements of the joint. The content is preferably 50 mol % or less, more preferably 30 mol % or less, still more preferably 15 mol % or less. More specifically, when the main oxide of the oxide ceramic is $Fe_2O_3$, the second compound may contain the same element as in $Fe_3O_4$ or FeO or a different element as in $TiO_2$, $SnO_2$, $Nb_2O_5$, $SiO_2$, or $ZrO_2$. When the main oxide is CuO or NiO, the second compound may be $Li_2CO$, $Na_2CO_3$, or $K_2CO_3$. The term "main oxide", as used herein, refers to an oxide highest in amount among the constituent compounds of the joint and may be an oxide constituting 40 mol % or more of the joint, an oxide constituting 50 mol % or more of the joint, or an oxide constituting 70 mol % or more of the joint.

A joined body according to the present invention preferably has high capability of joining the first member and the second member together. The term "high capability of joining", as used herein, means that no separation is observed at the interface between the first member, the second member, and the oxide ceramic of the joint, or no cracks are observed in the porous ceramic, the metal member, and the oxide ceramic of the joint. A method for evaluating joining capability will be described below. An observation sample is prepared by embedding a joined body according to the present invention in a resin and mirror-polishing the joined body with diamond slurry or the like. The sample is then inspected with a scanning electron microscope (SEM) at a magnification of 1500 or more for separation between the porous ceramic, the metal member, and the joint, and for cracks in the porous ceramic, the metal member, and the joint. The capability of joining the first member and the second member together can be evaluated on the basis of the inspection results.

A joined body according to the present invention preferably has a joining strength of 3.5 MPa or more between the first member and the second member. The joining strength is measured in a four-point bending test (JIS-R1632). The joining strength is more preferably 5.0 MPa or more, still more preferably 10 MPa or more. Although higher joining strength is preferred because of stronger joining and higher reliability, the upper limit is approximately 500 MPa in terms of material composition.

A joined body according to the present invention in which a metal member serving as an electrode is joined to an electrically conductive porous ceramic preferably has an electrical resistivity of $10^6$ Ωcm or less. The joined body more preferably has an electric resistivity of $10^{-2}$ Ωcm or less, still more preferably $10^3$ Ωcm or less. Although a lower electrical resistivity results in a joined body having higher electrical conductivity and more efficient electric utilization, the lower limit is approximately $10^{-2}$ Ωcm in terms of material composition. The electrical resistivity is measured by a two-terminal method in a sample prepared by baking a Ag paste as an electrode on a joined body processed or formed into a rectangular parallelepiped having a diameter of 20 mm square.

A joined body according to the present invention may be produced through a joining step of joining a first member to a second member with an oxide ceramic, wherein the oxide ceramic is produced by forming a multilayer body that includes the first member and the second member with a metal raw material interposed therebetween and firing the multilayer body in the air in a temperature range lower than the melting point of an oxide of the metal raw material. In this step, the joint is formed of the oxide ceramic produced by oxidation of the metal raw material by firing. The joining temperature in the firing is in a suitable range depending on the material of the joint and is preferably 400° C. or more, more preferably 500° C. or more, still more preferably 600° C. or more. The joining temperature is preferably 900° C. or less, more preferably 850° C. or less, still more preferably 800° C. or less. The joining temperature is preferably as high as possible in terms of sufficient oxidization and is preferably as low as possible in terms of energy consumption. In a joined body according to the present invention, the joint may be formed from a metal raw material having an average particle size in the range of 1 to 40 μm. The raw material of the joint preferably has an average particle size of 30 μm or less, more preferably 10 μm or less, still more preferably 5 μm or less. The average particle size is preferably 3 μm or more. The average particle size of the raw material particles is the median size (D50) measured with a laser diffraction/scattering particle size distribution analyzer using water as a dispersion medium. In a joined body according to the present invention, the joint may be formed from a metal raw material having a volume change ratio Y/X of 0.7 or more. The volume change ratio Y/X is the ratio of the volume Y after oxidation to the volume X before the oxidation. In particular, the joint may be formed from a metal raw material having a volume change ratio Y/X of 1.3 or more, preferably 1.6 or more.

A joint according to the present invention is preferably formed by mixing a plurality of raw material powders having different particle sizes. This can further increase the joining strength of the joint. For example, when the first or second member to be joined is a porous ceramic, the joint may be formed by mixing a first raw material powder having an average particle size (μm) smaller than or equal to the average pore size A (μm) of the porous ceramic and a second raw material powder having an average particle size (μm) greater than the average pore size A. For example, the average particle size (μm) of the first raw material powder is preferably not more than the half, more preferably not more than one-third, of the average pore size A (μm). For example, the average particle size (μm) of the second raw material powder is preferably at least twice, more preferably at least three times, the average pore size A. The first raw material powder is preferred in order to penetrate into the pores of the porous ceramic, and the second raw material powder is preferred in order to improve the strength of the joint itself. The amount of the first raw material powder is preferably greater than the amount of the second raw material powder. For example, the amount of the first raw material powder is preferably 20% or more by volume, more preferably 35% or more by volume. The joint may be formed using only a first raw material powder having an average particle size smaller than or equal to the average pore size A of the porous ceramic.

In a joined body according to the present invention, the difference between the thermal expansion coefficient (CTE) of the first member and the thermal expansion coefficient of the second member may be 4.0 ppm/K or more. Even in a joined body formed by joining members having relatively significantly different thermal expansion coefficients, a joint of an oxide ceramic can maintain the joining strength and electrical conductivity of the joined body. In particular, even in a joined body for repeated use, the joined body can retain the joining strength and electrical conductivity. The difference between the thermal expansion coefficients may be 6.0 ppm/K or more or 15 ppm/K or less. For example, the thermal expansion coefficient is 18 ppm/K in a Cr—Ni—Fe alloy (SUS 304), 12 ppm/K in a Cr—Fe alloy (SUS 430), 4.6 ppm/K in a Si-bonded SiC sintered body, 7.0 ppm/K in an $Al_2O_3$ porous body, or 9.4 ppm/K in $LaCrO_3$.

Figure 4:
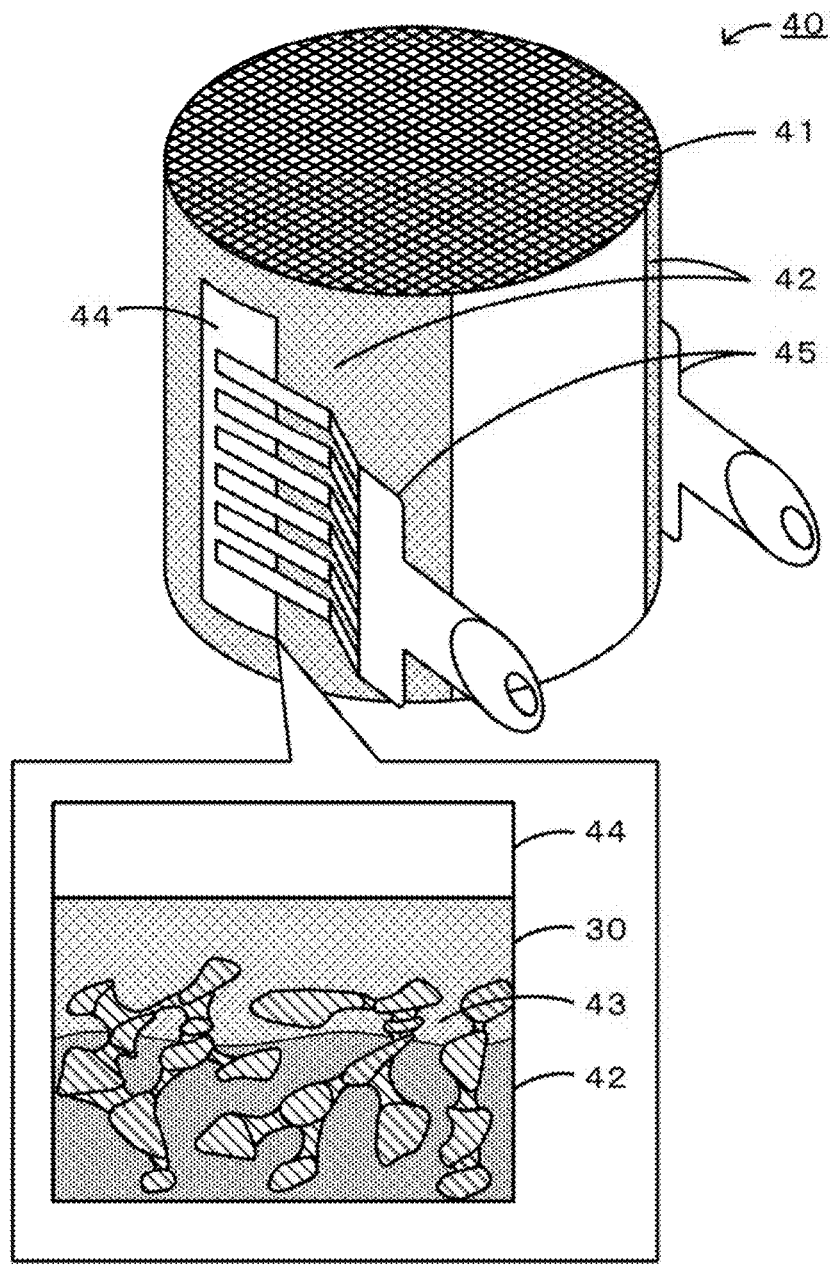
FIG. 4 is an explanatory view of a honeycomb structure 40, which is an example of the joined body 20.

A joined body according to the present invention may have any structure in which a first member and a second member are joined together, and can be used in honeycomb structures, thermoelectric elements, ceramic heaters, and oxygen and NOx gas sensors, for example. For example, in honeycomb structures, a joined body according to the present invention is suitably used to heat a honeycomb structure by the application of a voltage to the metal member. FIG. 4 is an explanatory view of a honeycomb structure 40, which is an example of the joined body 20. The honeycomb structure 40 is configured to heat a honeycomb substrate 41 by the application of a voltage to electrode terminals 45. The honeycomb structure 40 includes the honeycomb substrate 41, an electrically conductive porous portion 42 corresponding to the porous ceramic 22 and having higher electrical conductivity than the honeycomb substrate 41, a metal electrode 44 corresponding to the metal member 24 and joined to the electrically conductive porous portion 42, and an electrode terminal 45 connected to the metal electrode 44. Like the joined body 20 illustrated above in FIG. 1, a joint 30 is an oxide ceramic containing at least one transition metal that joins the electrically conductive porous portion 42 to the metal electrode 44. For example, the joint 30 may be an electrically conductive metal oxide. The difference in electrical conductivity between the honeycomb substrate 41 and the electrically conductive porous portion 42 may result from different metal contents, for example. For example, when the honeycomb structure is formed of a Si-bonded SiC ceramic, the electrically conductive porous portion 42 may have a higher Si content.

A method for producing a joined body according to the present invention will be described below. For example, a method for producing a joined body according to the present invention may include a substrate production step of producing a first member and a second member and a joining step of forming a joint between the first member and the second member and thereby joining them together. The substrate production step may be omitted by separately preparing the first member and the second member.

[Substrate Production Step]

In this step, a substrate is produced. For example, when the first member is a porous ceramic or dense ceramic, the substrate may be produced by mixing raw materials, forming the raw materials by a predetermined forming method, and firing the formed product. For example, the porous ceramic may contain at least one inorganic material selected from carbides, such as silicon carbide, titanium carbide, zirconium carbide, and boron carbide, nitrides, such as silicon nitride, aluminum nitride, titanium nitride, and zirconium nitride, oxynitrides, such as sialon, silicides, such as molybdenum silicide, and zirconium phosphate. For example, the porous ceramic may contain at least one inorganic material selected from cordierite, mullite, zeolite, aluminum titanate, aluminum oxide, zirconium oxide, titanium oxide, silicon oxide, and magnesium oxide. In this step, for example, an aggregate of an inorganic material, a pore-forming material, and a dispersion medium may be mixed to adjust a pug or slurry. The raw material mixture is preferably prepared such that the porosity and average pore size of the porous ceramic are in the ranges described above; for example, the porosity is 10% or more by volume, and the average pore size ranges from 1 to 300 µm. In this step, the first member may be produced by filling pores of a porous ceramic with an impregnating material. For example, this impregnating treatment may include forming an impregnated substrate on a porous ceramic and heating the impregnated substrate at a temperature at which the impregnated substrate melts. When the porous ceramic is a Si-bonded SiC sintered body, the impregnating material may be metallic Si.

In this step, when the first and second members are metal members, a metal may be processed in a predetermined shape. The metal member may be made of any metal, such as a typical metal or transition metal, and is preferably highly electrically conductive, for example. The transition metal is preferably a metal such as Fe, Co, Ni, or Cu or an alloy thereof. Depending on the use, a noble metal, such as Pt or Au, may be used. For example, the metal member may be processed into a plate.

The difference between the thermal expansion coefficients of the first member and the second member produced in this step may be 4.0 ppm/K or more. Even in a joined body formed by joining members having relatively significantly different thermal expansion coefficients, a joint of an oxide ceramic can maintain the joining strength and electrical conductivity of the joined body. In particular, even in a joined body for repeated use, the joined body can retain the joining strength and electrical conductivity. The difference between the thermal expansion coefficients may be 6.0 ppm/K or more or 15 ppm/K or less.

The substrate production step, for example, in the production of a Si-bonded SiC ceramic (composite material) as a porous ceramic will be more specifically described. In this case, for example, a plastic pug can be formed by mixing a SiC powder and a Si powder at a predetermined volume ratio and mixing the mixture with a dispersion medium, such as water, a pore-forming material, and an organic binder. The pore-forming material is preferably one that can be burned by subsequent firing, for example, starch, coke, or foamable resin. The binder is preferably an organic binder, such as cellulose. The dispersant may be a surfactant, such as ethylene glycol. For example, the porous ceramic may be formed as a honeycomb formed product in the shape described above by extrusion using a die with which an array of cells can be formed. The honeycomb formed product is preferably dried, calcined, and fired. In calcination, the organic components in the honeycomb formed product are removed by combustion at a temperature lower than the firing temperature. The firing temperature may range from 1400° C. to 1500° C., preferably 1430° C. to 1450° C. The firing atmosphere is preferably, but not limited to, an inert atmosphere, more preferably an Ar atmosphere. A honeycomb substrate (Si-bonded SiC ceramic) formed of a sintered body can be produced through these steps.

[Joining Step]

In this step, the first member is joined to the second member with a joint by joining treatment. The first member and the second member may be any of the members described above. The material for use in the joint may be a transition metal powder. The material is preferably oxidized to oxide ceramic. Metal oxide powders are not suitable as raw materials for the joint because joining of the first member and the second member is insufficient even after heat treatment. For example, the metal powder preferably has an average particle size in the range of 1 to 40 µm. This range tends to result in appropriate joining strength. The raw material of the joint preferably has an average particle size of 30 µm or less, more preferably 10 µm or less, still more preferably 5 µm or less. The average particle size is more preferably 3 µm or more.

In this step, a plurality of raw material powders having different particle sizes are preferably mixed to prepare the raw material powder of the joint. This can further increase the joining strength of the joint. For example, when the first member is a porous ceramic, a first raw material powder having an average particle size (µm) smaller than or equal to the average pore size A (µm) of the porous ceramic may be mixed with a second raw material powder having an average particle size (µm) greater than the average pore size A. For example, the average particle size (µm) of the first raw material powder is preferably not more than the half, more preferably not more than one-third, of the average pore size A (µm). For example, the average particle size (µm) of the second raw material powder is preferably at least twice, more preferably at least three times, the average pore size A. The first raw material powder is preferred in order to penetrate into the pores of the porous ceramic, and the second raw material powder is preferred in order to improve the strength of the joint itself. The amount of the first raw material powder is preferably greater than the amount of the second raw material powder. For example, the amount of the first raw material powder is preferably 20% or more by volume, more preferably 35% or more by volume. The raw material powder of the joint may be only a first raw material powder having an average particle size smaller than or equal to the average pore size A of the porous ceramic.

In this step, in addition to a first component, which is a main component and is a metal, a compound containing a second component (second compound) is preferably added to the raw material powder of the joint. The second component is a metallic element. The second compound may be a conductive aid. The addition of the second compound to the joint is preferred because a solid solution of the second compound in the main oxide of the oxide ceramic can provide additional electrical conductivity and further suppress a decrease in electrical conductivity under heating. The addition of the second compound to the joint is also preferred because this can further reduce the electrical resistance of the joint and suppress heat generation. For example, the second compound is preferably a compound containing a metallic element having a valence different from the valence of the main oxide, or may contain the same metal as the main oxide, or may contain a different metal from the main oxide. For example, the second compound preferably contains at least one element of Li, Na, K, Ga, Si, Zr, Ti, Sn, Nb, Sb, and Ta. The second compound may be a carbonate or oxide. For example, the amount of second compound to be added is preferably 0.2 mol % or more, more preferably 0.5 mol % or more, still more preferably 1.0 mol % or more, based on the number of moles of all the elements of the joint. The content is preferably 50 mol % or less, more preferably 30 mol % or less, still more preferably 15 mol % or less. More specifically, when the main oxide of the oxide ceramic is $Fe_2O_3$, the second compound may contain the same element as in $Fe_3O_4$ or FeO or a different element as in $TiO_2$, $SnO_2$, $Nb_2O_5$, $SiO_2$, or $ZrO_2$. When the main oxide is CuO or NiO, the second compound may be $Li_2CO$, $Na_2CO_3$, or $K_2CO_3$.

In this step, the metal raw material is preferably fired while the metal member is restricted in its movements. This can prevent misalignment of the metal member. Furthermore, the metal member can be more securely joined to the joint. The phrase "restricted in its movements" means that the metal member may be fixed with a weight, for example, with a holding jig. Although the porous ceramic and the metal member can be fixed by positive pressurization, such treatment is preferably omitted in order to simplify the production process. Joining treatment can be performed in the air, for example. The joining temperature (firing temperature) preferably ranges from 400° C. to 900° C. In this temperature range, the metal raw material can be oxidized to oxide ceramic. The joining temperature is in a suitable range depending on the material of the joint and is more preferably 500° C. or more, still more preferably 600° C. or more. The joining temperature is more preferably 850° C. or less, still more preferably 800° C. or less. The joining temperature is preferably as high as possible in terms of sufficient oxidization and is preferably as low as possible in terms of energy consumption. Thus, joining treatment can be performed in a simple atmosphere, that is, in the air and at low temperatures of 900° C. or less. In this step, firing is preferably performed such that the porosity of the oxide ceramic is 60% or less by volume, preferably 50% or less by volume, still more preferably 30% or less by volume. The oxide ceramic is still more preferably a dense body in terms of joining strength. In this step, firing is preferably performed such that the porosity of the oxide ceramic is 5% or more by volume, more preferably 10% or more by volume, still more preferably 20% or more by volume. The oxide ceramic preferably has pores in terms of stress relaxation.

In this step, a pore-forming material may be added to the raw material powder of the joint. For example, the amount of pore-forming material in the joint is preferably 10% or more by volume, more preferably 20% or more by volume. The pore-forming material preferably constitutes 10% or more by volume because this promotes stress relaxation in the joint. This amount is preferably 50% or less by volume, more preferably 30% or less by volume. The pore-forming material preferably constitutes 50% or less by volume because this can further suppress a decrease in mechanical strength in the joint. The amount of pore-forming material in the joint may be appropriately determined on the basis of the relationship between the degree of stress relaxation and mechanical strength in the joint.

In accordance with a joined body of the present embodiment and a method for producing the joined body described above, two members can be more simply and more reliably joined together. The following is a plausible reason for this. For example, the joint is the oxide ceramic and is therefore stable at high temperatures and in oxygen atmospheres. Because the raw material of the joint is a relatively reactive metal raw material, the raw material can relatively easily react with the first and second members, incorporate a component of the members, and allow the joint to be bonded to the first and second members while the component is diffused therein. It is supposed that when fired in the air, the raw material becomes less reactive through oxidation of the metal, thereby preventing the component incorporated from the members from excessively diffusing into the joint. When the member to be joined is a porous ceramic, a relatively dense oxide ceramic penetrates into the pores of the porous ceramic and strongly combines a joining layer with the porous ceramic. Thus, two members can be more simply and more reliably joined together. In a joined body according to the present embodiment, members having relatively significantly different thermal expansion coefficients can be joined together. This is probably because, for example, residual pores in the joint relieve stress between the first member and the second member, or mass transfer at an interface of the joint results in a gradient change in thermal expansion coefficient. In a joined body according to the present embodiment, joining requires no atmosphere control, such as vacuum or an inert gas atmosphere, and can be easily performed in the air at low temperatures.

The present invention should not be limited to the embodiments described above and can be implemented in various aspects within the scope of the present invention.

EXAMPLES

Specific experimental examples of the production of a joined body will be described below. Experimental Examples 1 to 18 and 21 to 25 correspond to examples of the present invention, and Experimental Examples 19, 20, and 26 correspond to comparative examples. In the present examples, porous ceramics, dense ceramics, metal members, and composite oxide members were used as members to be joined.

[Production of Porous Ceramic]

A Si-bonded SiC sintered body and an $Al_2O_3$ porous body were produced as porous ceramics. A "mixed powder" was prepared as a raw material for the porous ceramic of the Si-bonded SiC sintered body by mixing a SiC powder and a metallic Si powder at a volume ratio of 38:22. A binder hydroxypropylmethylcellulose, a pore-forming material starch, a water-absorbing resin, and water were added to the "mixed powder" to prepare a raw material for a porous material (a forming raw material). The forming raw material was kneaded and formed into a cylindrical pug. The cylindrical pug was extruded from an extruder to form a honeycomb formed product. The formed product was dried at 120° C. in the air to produce a dried product. The dried product was degreased at 450° C. in the air and was then fired at 1450° C. for 2 hours in an Ar atmosphere at normal pressure. Thus, a honeycomb porous ceramic was formed. A 10×20× 35 mm rectangular parallelepiped sample was cut from the honeycomb porous ceramic as a substrate (porous ceramic). The substrate had a porosity of 40% by volume as measured by a mercury intrusion method with a mercury porosimeter (AutoPore IV 9520 manufactured by MicroMetrics, Inc.) and an average pore size of 10 μm as measured by the same method. The $Al_2O_3$ porous body was produced by kneading an alumina powder and a pore-forming material, forming a pug, pressing the pug, and sintering the pug at 1200° C. The substrate had a porosity of 40% by volume and an average pore size of 10 μm.

[Production of Dense Ceramic]

A Si-impregnated SiC sintered body, which is produced by impregnating a SiC sintered body with metallic Si, and a ceramic member made of a composite oxide material $LaCrO_3$ were produced as dense ceramics. In the case of the Si-impregnated SiC sintered body, a binder hydroxypropylmethylcellulose, a pore-forming material starch, a water-absorbing resin, and water were added to the raw material SiC powder to prepare a raw material for a porous material (a forming raw material). The forming raw material was kneaded and formed into a cylindrical pug. The cylindrical pug was extruded from an extruder to form a rod-like formed product (10×20×35 mm). The formed product was dried at 120° C. in the air, was degreased at 450° C. in the air, and was then fired at 1450° C. for 2 hours in an Ar atmosphere at normal pressure. The resulting porous ceramic was impregnated with metallic Si to produce a substrate (dense ceramic). The impregnating treatment was performed as described below. Metallic Si pellets were placed on the porous ceramic. Metallic Si was impregnated into pores at 1500° C. under reduced pressure by the action of capillarity. The impregnated ceramic was then cooled by introducing Ar up to the atmospheric pressure, thus producing the Si-impregnated SiC sintered body. The substrate had a porosity of 0.1% or less by volume as measured by a mercury intrusion method with a mercury porosimeter. In the case of $LaCrO_3$, equimolar amounts of lanthanum oxide and chromium oxide were mixed and pressed to form a rod-like formed product (10×20×35 mm). The formed product was fired at 1600° C. for 2 hours in the air, thus producing a sintered body. The Si-impregnated SiC sintered body and the composite oxide member had a porosity of 0.1% or less by volume as measured by a mercury intrusion method with a mercury porosimeter.

A stainless steel member (SUS) was prepared as a metal member. The stainless steel member was made of a Cr—Fe alloy (SUS 430). The metal member was used in the form of a 3×4×20 mm rod in the experiment. The metal member had a porosity of 0.1% or less by volume as measured by a mercury intrusion method with a mercury porosimeter.

[Production of Joined Body]

Figure 5:
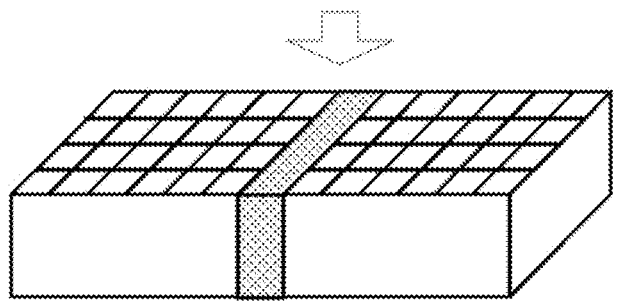
FIG. 5 is an explanatory view of a porous ceramic honeycomb joint body.
Figure 6:
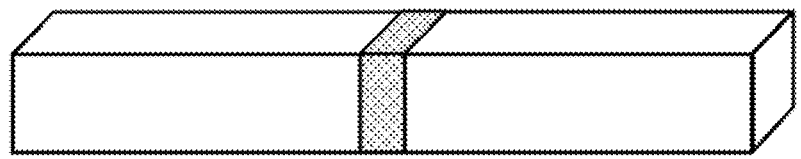
FIG. 6 is an explanatory view of a dense material joint body.

A raw material powder (an Fe, Cu, or Ni metal powder, or $Fe_2O_3$) of a joint material, a binder poly(vinyl butyral) resin (PVB), and a solvent terpineol were mixed to prepare a joint material paste. The joint material paste was applied to two members to be joined. The two members were bonded together with the paste interposed therebetween. The bonded sample was left to stand overnight at 80° C. in the air, thereby sufficiently evaporating terpineol. While a jig was placed on the sample to restrict the movement of the two members, the sample was fired (joined) in the air at a temperature in the range of 200° C. to 800° C. In Experimental Examples 1 to 11, as illustrated in FIG. 5, side surfaces of honeycombs were joined together. In Experimental Examples 12 to 18, as illustrated in FIG. 6, tips of rods were joined together.

Experimental Example 1

In Experimental Example 1, the first member and the second member were the Si-bonded SiC sintered bodies, and the metal raw material of the main oxide of the joint was an Fe powder. The raw materials of the joint were a first raw material powder (Fe powder) having an average particle size of 3 μm, which was smaller than the average pore size (10 μm) of the substrate, and a second raw material powder (Fe powder) having an average particle size of 35 μm, which was greater than the average pore size (10 μm) of the substrate. The first raw material powder and the second raw material powder were mixed at a volume ratio of 40:60. In Experimental Example 1, the joining condition was 750° C. for 1 hour in the air. Table 1 summarizes the members, the type of joint raw material, the blend ratio of metal raw materials, and the joining conditions for each sample of Experimental Examples 1 to 20.

Experimental Examples 2 to 7

In Experimental Examples 2 to 7, the addition of a second compound (conductive aid) containing a second component to the joint was examined. The second component was Ti, Sn, or Nb. In Experimental Examples 2 to 4, the metal raw material of the joint was the Fe powder, to which 1.0 mol %, 3.0 mol %, and 5.0 mol % $TiO_2$ were added as the second compounds, respectively. Each of these additive amounts is the number of moles of the second compound based on the total number of moles with respect to the joint. In Experimental Examples 5 and 6, the metal raw material of the main component of the joint was the Fe powder, to which 1.0 mol % and 10 mol % $SnO_2$ were added as the second compounds, respectively. In Experimental Example 7, the metal raw material of the main component of the joint was the Fe powder, to which 10 mol % $Nb_2O_5$ was added as the second compound.

Experimental Examples 8 to 11

Experimental Example 8 was produced in the same manner as Experimental Example 1 except that a raw material powder (Cu powder) having an average particle size of 3 μm was used alone. Experimental Example 9 was produced in the same manner as Experimental Example 8, except that the second component was Li, and 1 mol % $Li_2CO_3$ was added as the second compound. Experimental Example 10 was produced in the same manner as Experimental Example 1 except that a raw material powder (Ni powder) having an average particle size of 35 μm was used alone. Experimental Example 11 was produced in the same manner as Experimental Example 10 except that 1 mol % $Li_2CO_3$ was added as the second compound.

Experimental Examples 12 and 13

In Experimental Example 12, the first member and the second member were the Si-impregnated SiC sintered bodies, and the metal raw material of the main oxide of the joint was the Fe powder, to which 1.0 mol % $TiO_2$ was added as the second compound. The raw material of the joint was a mixture of the first raw material powder and the second raw material powder mixed at a volume ratio of 40:60. Experimental Example 13 was the same as Experimental Example 12 except that 1.0 mol % $SnO_2$ was added as the second compound.

Experimental Examples 14 to 18

In Experimental Example 14, the first member and the second member were stainless steel members (SUS), and the metal raw material of the main oxide of the joint was the Fe powder, to which 3.0 mol % $TiO_2$ was added as the second compound. In Experimental Example 14, the raw material of the joint was a mixture of the first raw material powder and the second raw material powder mixed at a volume ratio of 40:60. In Experimental Example 15, the first member was the $LaCrO_3$ ceramic member, the second member was the stainless steel member (SUS), and the metal raw material of the main oxide of the joint was the Fe powder, to which 1.0 mol % $TiO_2$ was added as the second compound. In Experimental Example 15, the raw material of the joint was a mixture of the first raw material powder and the second raw material powder mixed at a volume ratio of 40:60. In Experimental Example 16, the first member and the second member were stainless steel members (SUS), the metal raw material of the main oxide of the joint was the Fe powder, to which no second compound was added. In Experimental Example 16, the raw material of the joint was the second raw material powder having an average particle size of 35 μm alone. In Experimental Example 17, the first member and the second member were stainless steel members (SUS), and the metal raw material of the main oxide of the joint was the Fe powder, to which 1.0 mol % $TiO_2$ was added as the second compound. In Experimental Example 17, the raw material of the joint was the second raw material powder having an average particle size of 35 μm alone. In Experimental Example 18, the first member and the second member were stainless steel members (SUS), the metal raw material of the main oxide of the joint was the Fe powder, to which no second compound was added. In Experimental Example 18, the raw material of the joint was the first raw material powder having an average particle size of 3 μm alone.

Experimental Examples 19 and 20

In Experimental Example 19, the raw material of the joint material was an iron oxide ($Fe_2O_3$) powder having an average particle size of 5 μm. Experimental Example 20 was produced under the same conditions as in Experimental Example 1 except that the joining temperature was 200° C.

TABLE 1

| | First member | | Second member | | Joint raw materials | | | Blend ratio of metal raw materials | | Joining conditions | |
|---|---|---|---|---|---|---|---|---|---|---|---|
| | Materials | Porosity/ vol % | Materials | Porosity/ vol % | Metal raw materials | Second component | Additive amounts mol % | 3 μm | 35 μm | Temperature/ ° C. | Atmosphere |
| Experimental Example 1 | Si-bonded SiC | 40 | Si-bonded SiC | 40 | Fe | Absent | 0 | 40 | 60 | 750 | The air |
| Experimental Example 2 | Si-bonded SiC | 40 | Si-bonded SiC | 40 | Fe | $TiO_2$ | 1 | | | | |
| Experimental Example 3 | Si-bonded SiC | 40 | Si-bonded SiC | 40 | Fe | $TiO_2$ | 3 | | | | |
| Experimental Example 4 | Si-bonded SiC | 40 | Si-bonded SiC | 40 | Fe | $TiO_2$ | 5 | | | | |
| Experimental Example 5 | Si-bonded SiC | 40 | Si-bonded SiC | 40 | Fe | $SnO_2$ | 1 | | | | |
| Experimental Example 6 | Si-bonded SiC | 40 | Si-bonded SiC | 40 | Fe | $SnO_2$ | 10 | | | | |
| Experimental Example 7 | Si-bonded SiC | 40 | Si-bonded SiC | 40 | Fe | $Nb_2O_3$ | 10 | | | | |
| Experimental Example 8 | Si-bonded SiC | 40 | Si-bonded SiC | 40 | Cu | Absent | 0 | 100 | 0 | | |
| Experimental Example 9 | Si-bonded SiC | 40 | Si-bonded SiC | 40 | Cu | $Li_2CO_3$ | 1 | 100 | 0 | | |
| Experimental Example 10 | Si-bonded SiC | 40 | Si-bonded SiC | 40 | Ni | Absent | 0 | 0 | 100 | | |
| Experimental Example 11 | Si-bonded SiC | 40 | Si-bonded SiC | 40 | Ni | $Li_2CO_3$ | 1 | 0 | 100 | | |
| Experimental Example 12 | Si-impregnated SiC | <0.1 | Si-impregnated SiC | <0.1 | Fe | $TiO_2$ | 1 | 40 | 60 | | |
| Experimental Example 13 | Si-impregnated SiC | <0.1 | Si-impregnated SiC | <0.1 | Fe | $SnO_2$ | 1 | | | | |
| Experimental Example 14 | SUS | <0.1 | SUS | <0.1 | Fe | $TiO_2$ | 3 | | | | |
| Experimental Example 15 | $LaCrO_3$ | <0.1 | SUS | <0.1 | Fe | $TiO_2$ | 1 | | | | |
| Experimental Example 16 | SUS | <0.1 | SUS | <0.1 | Fe | Absent | 0 | 0 | 100 | | |
| Experimental Example 17 | SUS | <0.1 | SUS | <0.1 | Fe | $TiO_2$ | 1 | 0 | 100 | | |
| Experimental Example 18 | SUS | <0.1 | SUS | <0.1 | Fe | Absent | 0 | 100 | 0 | | |
| Experimental Example 19 | Si-bonded SiC | 40 | SUS | <0.1 | $Fe_2O_3$ | Absent | 0 | 5 μm-100 vol % | | 800 | The air |

TABLE 1-continued

| | First member | | Second member | | Joint raw materials | | | Blend ratio of metal raw materials | | Joining conditions | |
|---|---|---|---|---|---|---|---|---|---|---|---|
| | Materials | Porosity/ vol % | Materials | Porosity/ vol % | Metal raw materials | Second component | Additive amounts mol % | 3 μm | 35 μm | Temperature/ ° C. | Atmosphere |
| Experimental Example 20 | Si-bonded SiC | 40 | SUS | <0.1 | Fe | | | 5 μm-100 vol % | | 200 | |

Experimental Examples 21 to 23

In Experimental Example 21, the first member was the Si-bonded SiC sintered body, the second member was the stainless steel member (SUS), and the metal raw material of the main oxide of the joint was the Fe powder, to which 1.0 mol % $TiO_2$ was added as the second compound. Experimental Example 22 was the same as Experimental Example 21 except that the first member was the Si-impregnated SiC

Experimental Example 26

Experimental Example 26 was under the same conditions as in Experimental Example 1 except that the raw material of the joint material was a silicon (Si) powder having an average particle size of 3 μm. Table 2 summarizes the members, the type of joint raw material, the blend ratio of metal raw materials, and the joining conditions for each sample of Experimental Examples 21 to 26.

TABLE 2

| | First member | | | Second member | | | Joint raw materials | | | Blend ratio of metal raw materials | | Joining conditions | |
|---|---|---|---|---|---|---|---|---|---|---|---|---|---|
| | Materials | Porosity/ vol % | CTE ppm/K | Materials | Porosity/ vol % | CTE ppm/K | Metal raw materials | Second component | Additive amounts mol % | 3 μm | 35 μm | Temperature/ ° C. | Atmosphere |
| Experimental Example 21 | Si-bonded SiC | 40 | 4.6 | SUS | <0.1 | 12 | Fe | $TiO_2$ | 1 | 40 | 60 | 750 | The air |
| Experimental Example 22 | Si-impregnated SiC | <0.1 | 4.5 | SUS | <0.1 | 12 | Fe | $TiO_2$ | 1 | | | | |
| Experimental Example 23 | $Al_2O_3$ | 40 | 7 | SUS | <0.1 | 12 | Fe | $TiO_2$ | 1 | | | | |
| Experimental Example 24 | Si-bonded SiC | 40 | 4.6 | SUS | <0.1 | 12 | Fe | $TiO_2$ | 1 | 40 | 60 | 750 | The air |
| Experimental Example 25 | Si-bonded SiC | 40 | 4.6 | SUS | <0.1 | 12 | Fe | $TiO_2$ | 1 | | | | |
| Experimental Example 26 | Si-bonded SiC | 40 | 4.6 | SUS | <0.1 | 12 | Si | Absent | 0 | 100 | 0 | 750 | The air | sintered body. Experimental Example 23 was the same as Experimental Example 21 except that the first member was the $Al_2O_3$ porous body.

Experimental Examples 24 and 25

In Experimental Example 24, the first member was the Si-bonded SiC, the second member was the stainless steel member (SUS), and the metal raw material of the main oxide of the joint was the Fe powder, to which 1.0 mol % TiO2 was added as the second compound. Thirty-three parts by mass of poly(methyl methacrylate) resin per 100 parts by mass of the metal raw material and the second compound in total was added as a pore-forming material to the raw material of the joint. Experimental Example 25 was the same as Experimental Example 24 except that 77 parts by mass of poly(methyl methacrylate) resin per 100 parts by mass of the metal raw material and the second compound in total was added. In Experimental Examples 21 to 25, the raw material of the joint was a mixture of the first raw material powder and the second raw material powder mixed at a volume ratio of 40:60.

(Thermal Analysis of Joint Material)

Figure 7:
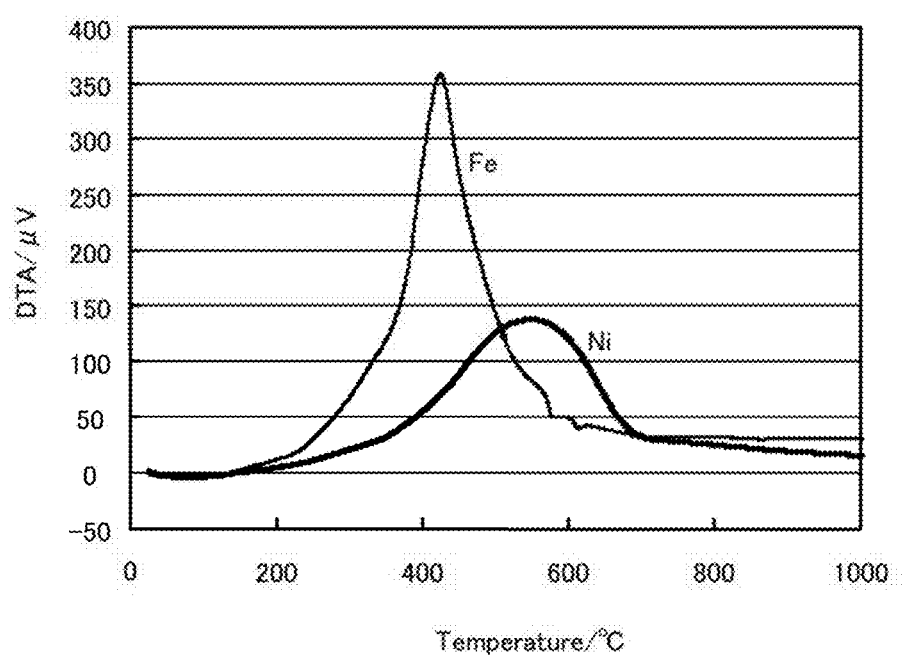
FIG. 7 is a thermal analysis result for metal raw materials of the joint.

Among the metals used in the joined body, Fe and Ni were subjected to thermal analysis. Eighty milligrams of a sample was subjected to measurement with a TG-DTA measuring instrument (ThremoPlus EVO manufactured by Rigaku Corporation) from room temperature to 1000° C. FIG. 7 is a thermal analysis result for metal raw materials of the joint. Fe started to generate heat at 200° C. and had an exothermic peak at 420° C. Ni started to generate heat at 200° C. and had an exothermic peak at 550° C. It was found that these metals could easily form oxides when heated at 400° C. or more and were therefore preferred. It was surmised that joining treatment could be performed with a higher amount of heat than the amount of heat obtained at the firing temperature due to the amount of heat resulting from the heat generation.

(Identification of Crystal Phase of Joint Material)

The constituent crystal phase of the oxide ceramic of the joint was identified in the joined body thus produced. In the measurement, X-ray diffraction patterns of the material were obtained with a rotating anode X-ray diffractometer (RINT manufactured by Rigaku Corporation). The X-ray diffraction measurement conditions were as follows: a CuKα radiation source, 50 kV, 300 mA, and 2θ=20 to 60 degrees.

(Porosity of Joint)

Figure 8:
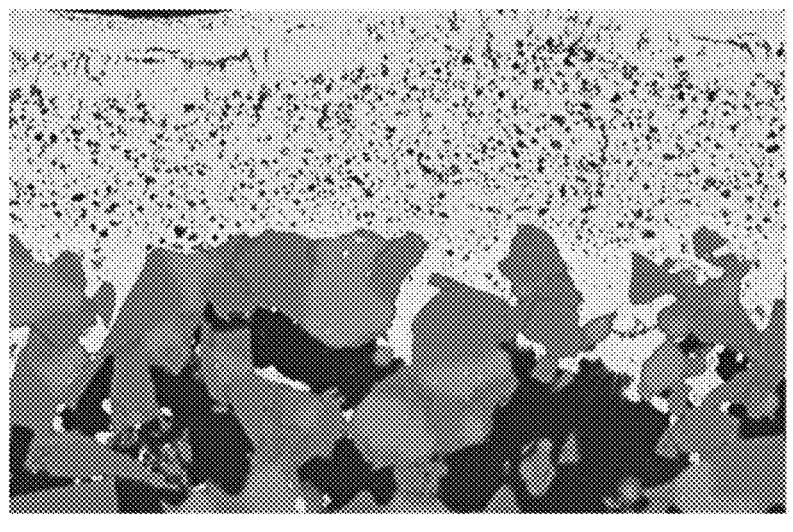
FIG. 8 is a SEM photograph of a cross section of the porous ceramic and joint according to Experimental Example 1.

The porosity of the joint was determined by image analysis. The joined body thus produced was embedded in a resin, and a cross section in which the first member, the second member, and the joint (oxide ceramic) could be simultaneously observed was mirror-polished. The polished surface was observed with an electron microscope (SEM; XL30 manufactured by Royal Philips Electronics) at a magnification of 200, and microstructure photographs were taken. A microstructure photograph image thus taken was subjected to image analysis to determine the porosity of the oxide ceramic. FIG. 8 is a SEM photograph of a cross section of the porous ceramic and joint according to Experimental Example 1. Image-Pro 0.5J was used as image analysis software. A region having an area of $0.5 \times 10^{-6}$ $m^2$ in the joint was chosen in a microstructure photograph and was subjected to binarization treatment to distinguish the pore images from the oxide ceramic image. In the distinguished image, the oxide ceramic was separated from the pores, and their area ratio was calculated as the porosity of the joint. The area ratio in the cross section was assumed to correspond substantially to the volume ratio and was considered to be the porosity (% by volume).

(Thickness of Reaction Layer at Interface)

Figure 9:
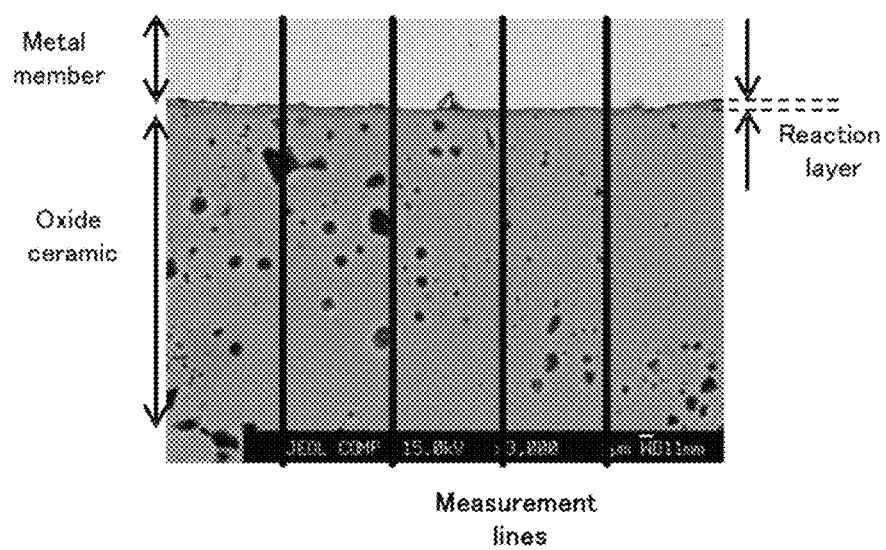
FIG. 9 is a SEM photograph of a cross section of the metal member and joint according to Experimental Example 14.
Figure 10:
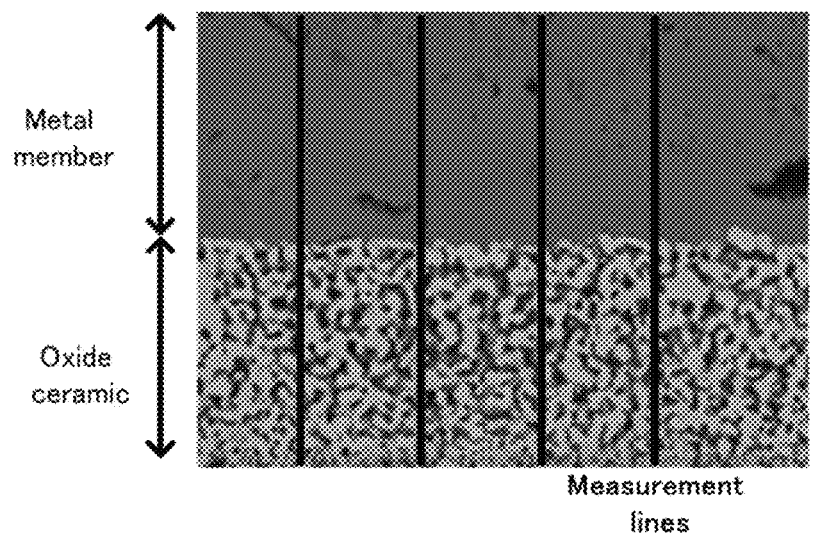
FIG. 10 is a SEM photograph of a cross section of the composite oxide member and joint according to Experimental Example 15.

The joining interface was examined in the joined body thus produced. The thickness of the reaction layer at the interface between the first member and the joint or at the interface between the second member and the joint was measured in an image taken in electron microscope (SEM) observation. More specifically, the joined body embedded in a resin was mirror-polished with diamond slurry to prepare an observation sample. The polished cross section was observed with SEM-EDX at a magnification of 3000. Then, as illustrated in FIG. 3, perpendicular lines (measurement lines) that were perpendicular to the interface in the image and divided the interface into five equal parts were drawn. The length between the points of intersection between the lower end and the upper end of the reaction layer at the interface and each of the measurement lines was measured. The five lengths were averaged to determine the thickness of the reaction layer. FIG. 9 is a SEM photograph of a cross section of the metal member and joint according to Experimental Example 14. FIG. 10 is a SEM photograph of a cross section of the composite oxide member and joint according to Experimental Example 15. When the first member and the second member were made of the same material, their joining interfaces were supposed to be the same. Thus, only the interface of the first member was evaluated. When a contrast due to a difference in composition at the interface was not observed even with SEM at a magnification of 3000, the reaction layer was considered to be "absent".

(Joining Strength)

The joining strength of the joined body was measured in a four-point bending test (according to JIS-R1632). The joining strength of each joined body was measured under a load applied in the B-axis (vertical) direction of the joined bodies illustrated in FIGS. 5 and 6. A joining strength of 3.5 MPa or more was rated as "A", a joining strength of 2.0 MPa or more and less than 3.5 MPa was rated as "B", a joining strength of 1.0 MPa or more and less than 2.0 MPa was rated as "C", and a joining strength of less than 1.0 MPa or unmeasurable joining strength was rated as "D". A joined body whose joining strength could not be measured was described as "Unmeasurable". A joining strength of 3.5 MPa is the mechanical strength of the Si-bonded SiC sintered body, and the joining strength can be higher than 3.5 MPa.

(Electric Resistivity)

Figure 11:
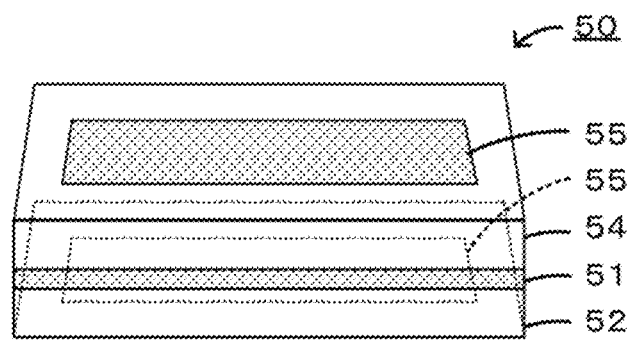
FIG. 11 is an explanatory view of a joined body 50.

The electric resistivity of the joined body was measured in a joined body 50 illustrated in FIG. 11. As illustrated in FIG. 11, a sample was prepared by baking a 15 mm×15 mm Ag paste as electrodes 55 on a joined body including a 20 mm×20 mm rectangular parallelepiped first member 52 and a rectangular parallelepiped second member 54 joined together with a joint 51. The electrodes of the joined body were connected to SourceMeter (Model 2450, manufactured by Keithley Instruments, Inc.). The electric resistivity of the joined body was measured by a direct-current two-terminal method. An electric resistivity of $10^3$ Ωcm or less was rated as "A", $10^3$ Ωcm or more and less than 10=12 cm was rated as "B", $10^5$ Ωcm or more and less than $10^6$ 11 cm was rated as "C", and $10^6$ Ωcm or more or unmeasurable electric resistivity was rated as "D".

(Initial Performance Rating)

Each joint material was evaluated at the time of production (initial performance rating). When the electric resistivity was $10^3$ Ωcm or less, and the joining strength was 3.5 MPa or more, the rating was "A". When the electric resistivity was $10^3$ Ωcm or less, and the joining strength was 2.0 MPa or more and less than 3.5 MPa, or when the electric resistivity was $10^3$ Ωcm or more and less than $10^5$ Ωcm, and the joining strength was 3.5 MPa or more, the rating was "B". When the joining strength was 1.0 MPa or more and less than 2.0 MPa, or the electric resistivity was $10^5$ Ωcm or more and less than $10^6$ Ωcm, the rating was "C". When the joining strength was less than 1.0 MPa, or the electric resistivity was $10^6$ Ωcm or more or unmeasurable, the rating was "D".

(Heat Resistance Test)

In the heat resistance test of the joined body, a joined body sample for joining strength measurement was held at 800° C. for 24 hours in the air. After the heat resistance test, joining strength and electric resistivity were measured as described above. In the heat resistance test evaluation, when the change in joining strength due to the heat resistance test was 10% or less, or the joining strength after the heat resistance test was 10 MPa or more, and when the change in electrical resistance was within one digit, the rating was "A". When the change in joining strength was 10% or less, and the change in electrical resistance was at least two digits, but the electrical resistance was less than $10^6$ Ωcm, the rating was "B". When the change in joining strength was more than 10%, or when the change in electrical resistance was at least two digits and the electrical resistance was $10^6$ Ωcm or more, the rating was "C". When the joining strength and electric resistivity were unmeasurable after the heat resistance test, the rating was "D".

(Overall Rating)

On the basis of the measurement results described above, each sample was comprehensively evaluated. When the initial performance rating and the heat resistance rating were "A", the overall rating was "A (excellent)". When at least one of the initial performance rating and the heat resistance rating was "B" or better, that is, the two ratings were "A" and "B", "B" and "A", or "B" and "B", the overall rating was "B (good)". When at least one of the initial performance rating and the heat resistance rating was "C", the overall rating was "C (fair)". When at least one of the initial performance rating and the heat resistance rating was unmeasurable "D", the overall rating was "F (poor)".

(Results and Discussion)

Table 3 summarizes the measurement results for Experimental Examples 1 to 20. Table 3 summarizes the crystal phase and porosity (% by volume) of the joint (oxide ceramic), the thickness of the reaction layer between the substrate and the joint material, the initial performance and ratings thereof, heat resistance test results and ratings thereof, and overall ratings. As shown in Table 2, the crystal phase of the joint in Experimental Examples 1 to 20 was an oxide layer. In Experimental Examples 1 to 11, no reaction layer containing a composite phase or the like formed by a reaction between the substrate and the joint was observed between the substrate and the joint. Although a reaction layer was formed in Experimental Examples 12 to 18, the thickness of the reaction layer was as small as 1 μm or less. The oxide ceramic joint material and the member to be joined are probably joined together at the interface therebetween through diffusion of part of the components constituting the member into the oxide ceramic. For example, the elementary analysis of an interface showed that the Fe—Cr alloy (SUS 430) and the $Fe_2O_3$ joint material were joined together at the interface therebetween through diffusion of Cr and a trace constituent Mn contained in the SUS into the oxide ceramic layer. It was also found that the Si-bonded SiC sintered body and the $Fe_2O_3$ joint material were joined together at the interface therebetween through diffusion of the Si component into the oxide ceramic layer. In the joined bodies according to the present examples, use of metals that are more active than oxides as raw materials of the joint probably promoted a reaction with the member and facilitated the incorporation of a component of the member. It is supposed that when fired in the air, as the temperature increased, the metals became less reactive through oxidation, thereby preventing the incorporated component of the member from excessively diffusing into the joint. When the member to be joined was a porous ceramic, SEM observation showed that a relatively dense oxide ceramic penetrated into the pores of the porous ceramic and strongly combined the joint with the porous ceramic. This probably improved the joining of the members.

In Experimental Examples 1 to 18, it was found that the joint was formed of the oxide ceramic of the transition metal and therefore had suitable electrical conductivity. In Experimental Examples 1 to 18, the joining state and the electric resistivity were not changed in the heat resistance test, and the heat resistance rating tended to be high. This is probably because the joint was formed of the oxide ceramic, which prevented further diffusion of the components contributing to joining. In particular, in Experimental Examples 2 to 7, 9, 11 to 15, and 17, the joint contained the conductive aid ($TiO_2$, $SnO_2$, $Nb_2O_5$, or $LiCO_3$), and the electric resistivity and heat resistance rating were very good, as shown in Table 2. Thus, it was found to be preferable for the oxide ceramic to contain a conductive aid. It was also found that the addition of such a conductive aid could further reduce the resistance of the joint. Thus, it was found that the joint could preferably be used as a current-carrying member because of its low heat generation. It was also found that the addition of a conductive aid could provide additional electrical conductivity due to a solid solution of an element of the conductive aid in the oxide ceramic and further suppress a decrease in electrical conductivity under heating. For example, if the main oxide of the oxide ceramic is an Fe oxide, then a heterophase, such as $Fe_3O_4$, or an oxygen defect introduced into $Fe_2O_3$ probably imparts electrical conductivity to the oxide ceramic. However, the heat resistance test could decrease such a heterophase and oxygen defects and lower the electrical conductivity (see Experimental Examples 1, 8, 10, 16, and 18). In contrast, it was surmised that when the conductive aid contained a different element, a solid solution of the different element in the main oxide contributed to electrical conductivity, thereby improving the heat resistance rating.

In Experimental Examples 1 to 18, the joining strength was high and was not decreased by the heat resistance test. This is probably also because the joint was formed of the oxide ceramic. In particular, in the oxide ceramic of the transition metal, the joining treatment caused a volume change from the metal to the oxide, which could form some pores. These pores were probably effective for stress relaxation. Otherwise, that is probably because mass transfer at the joining interface resulted in a gradient change in thermal expansion coefficient. In Experimental Examples 1 to 11, the substrate portion was broken in the four-point bending test, and the joining strength of the joint was not essentially measured. Thus, the joining strength could be higher than the strength of the substrate (3.5 MPa). In Experimental Examples 12 to 18, the joining strength was tens of megapascals and very high.

In Experimental Example 19, in which the raw material of the joint was the oxide, the member could not be sufficiently joined. In Experimental. Example 20, in which the joining temperature was as low as 200° C., the member could not be sufficiently joined. It was found that the joining temperature was preferably 400° C. or more. Considering the member to be joined and the oxidation temperature of the metal raw material of the joint, it was surmised that the joining temperature should be 900° C. or less, preferably 800° C. or less.

TABLE 3

| | Oxide ceramic | | Thickness of reaction layer at interface | | Initial Performance | | Initial performance rating | Performance after the heat resistance test | | Heat resistance rating | Overall rating |
|---|---|---|---|---|---|---|---|---|---|---|---|
| | Crystal Phase | Porosity/ vol % | First member μm | Second member μm | Electric resistivity | Joining strength MPa | | Electric resistivity | Joining strength | | |
| Experimental Example 1 | $Fe_2O_3$ | 11.2 | Absent | — | A | A | A | B | A | B | B |
| Experimental Example 2 | $Fe_2O_3$ | 10.9 | | — | A | A | A | A | A | A | A |
| Experimental Example 3 | $Fe_2O_3$ | 12.0 | | — | A | A | A | A | A | A | A |
| Experimental Example 4 | $Fe_2O_3$ | 11.3 | | — | A | A | A | A | A | A | A |
| Experimental Example 5 | $Fe_2O_3$ | 9.5 | | — | A | A | A | A | A | A | A |
| Experimental Example 6 | $Fe_2O_3$ | 10.0 | | — | A | A | A | A | A | A | A |
| Experimental Example 7 | $Fe_2O_3$ | 11.1 | | — | A | A | A | A | A | A | A |
| Experimental Example 8 | CuO | 10.7 | | — | A | A | A | B | B | B | B |
| Experimental Example 9 | CuO | 10.1 | Absent | — | A | A | A | B | B | B | B |
| Experimental Example 10 | NiO | 19.5 | Absent | — | B | A | B | B | B | B | B |

TABLE 3-continued

| | Oxide ceramic | | Thickness of reaction layer at interface | | Initial Performance | | Initial per-formance rating | Performance after the heat resistance test | | Heat resistance rating | Overall rating |
|---|---|---|---|---|---|---|---|---|---|---|---|
| | Crystal Phase | Porosity/ vol % | First member μm | Second member μm | Electric resistivity | Joining strength MPa | | Electric resistivity | Joining strength | | |
| Experimental Example 11 | NiO | 17.5 | Absent | — | A | A | A | B | B | B | B |
| Experimental Example 12 | Fe$_2$O$_3$ | 15.0 | 0.25 | — | A | A | A | A | B | A | A |
| Experimental Example 13 | Fe$_2$O$_3$ | 13.4 | 0.16 | — | A | A | A | A | B | A | A |
| Experimental Example 14 | Fe$_2$O$_3$ | 17.6 | 0.50 | — | A | A | A | A | B | A | A |
| Experimental Example 15 | Fe$_2$O$_3$ | 8.1 | Absent | 0.4 | A | A | A | A | B | A | A |
| Experimental Example 16 | Fe$_2$O$_3$ | 18.0 | 0.58 | — | A | A | A | A | B | A | A |
| Experimental Example 17 | Fe$_2$O$_3$ | 40.6 | 0.60 | — | A | A | A | A | B | A | A |
| Experimental Example 18 | Fe$_2$O$_3$ | 20.2 | 0.55 | — | A | A | A | B | A | B | B |
| Experimental Example 19 | Fe$_2$O$_3$ | Un-measurable | Absent | Absent | C | Un-measurable | D | D | D | D | F |
| Experimental Example 20 | Fe$_2$O$_3$ | | | | | | | | | | |

Table 4 summarizes the measurement results for Experimental Examples 21 to 26. Table 4 shows that in Experimental Examples 21 to 23, in which the difference between the thermal expansion coefficients of the first member and the second member joined together was 4.0 ppm/K or more, the initial performance rating and overall rating were high. That is, it was found that the joining strength was high, and the heat resistance was also high. Thus, in the joined bodies joined with the oxide ceramics, it was found that the members having significantly different thermal expansion coefficients could be joined together with higher joining strength and heat resistance. It was found that Experimental Examples 24 and 25, in which the porosity of the joint was as high as 55% to 70% by volume, also had high joining strength and heat resistance. In contrast, in Experimental Example 26, which was produced by firing in the air using a non-transition Si metal as the raw material of the joint, metallic Si was negligibly oxidized and consequently remained, resulting in unmeasurable joining strength, low heat resistance, and low joint functionality, although the electric resistivity was low.

TABLE 4

| | Oxide ceramic | | Thickness of reaction layer at interface | | Initial Performance | | Initial per-formance rating | Performance after the heat resistance test | | Heat resistance rating | Overall rating |
|---|---|---|---|---|---|---|---|---|---|---|---|
| | Crystal Phase | Porosity/ vol % | First member μm | Second member μm | Electric resistivity | Joining strength MPa | | Electric resistivity | Joining strength | | |
| Experimental Example 21 | Fe$_2$O$_3$ | 11.4 | Absent | Absent | A | A | A | A | A | A | A |
| Experimental Example 22 | Fe$_2$O$_3$ | 10.8 | Absent | Absent | A | A | A | A | A | A | A |
| Experimental Example 23 | Fe$_2$O$_3$ | 7.5 | Absent | Absent | B | A | B | B | A | B | B |
| Experimental Example 24 | Fe$_2$O$_3$ | 54.8 | Absent | 4.8 | B | B | B | B | B | B | B |
| Experimental Example 25 | Fe$_2$O$_3$ | 70 | Absent | 3 | B | C | C | B | C | B | C |
| Experimental Example 26 | SiO$_2$, Si | Un-measurable | Absent | — | C | D | D | D | D | D | F |

Thus, it was found that a joined body that included two members and a joint of an oxide ceramic of a transition metal joining the two members together could have more simple and more reliable joining. In particular, the present examples very advantageously require no atmosphere control for joining, such as vacuum or an inert gas atmosphere, and allow joining at low temperatures in the air.

The present invention should not be limited to the examples described above and can be implemented in various aspects within the scope of the present invention.

The present application claims priority from Japanese Patent Application No. 2013-056631 filed on Mar. 19, 2013, the entire contents of which are incorporated in the present specification by reference.

What is claimed is:

1. A joined body, comprising:
   a first member;
   a second member; and
   a joint joining the first member to the second member and being formed of 40 mol % or more of an oxide ceramic containing at least one transition metal selected from the group consisting of Fe, Ni and Cu as a main component and a second component in addition to the main component, the second component being at least one of Li, Na, K, Ga, Si, Zr, Ti, Sn, Nb, Sb, and Ta, and wherein the oxide ceramic joint has a porosity in the range of 5% to 70% by volume.

2. The joined body according to claim 1, wherein the oxide ceramic contains Fe as the main component and at least one of Si, Zr, Ti, Sn, Nb, Sb, and Ta as the second component.

3. The joined body according to claim 1, wherein the oxide ceramic contains at least one of Cu and Ni as the main component and at least one of Li, Na, and K as the second component.

4. The joined body according to claim 1, wherein the thickness of a reaction layer formed at a joining interface between the oxide ceramic and at least one of the first member and the second member is 3 μm or less.

5. The joined body according to claim 1, wherein a difference between the thermal expansion coefficient of the first member and the thermal expansion coefficient of the second member is 4.0 ppm/K or more.

6. The joined body according to claim 1, wherein the joint is the oxide ceramic formed by firing a multilayer body in the air in a temperature range lower than the melting point of an oxide of a metal raw material, the multilayer body comprising the first member, the second member and the metal raw material interposed therebetween.

7. A method for producing a joined body including a first member and a second member joined together, comprising a joining step of forming a joint for joining the first member to the second member with 40 mol % or more of an oxide ceramic containing at least one transition metal selected from the group consisting of Fe, Ni and Cu as a main component, the oxide ceramic being formed by forming a multilayer body comprising the first member, the second member and a metal raw material interposed therebetween and by firing the multilayer body in the air in a temperature range lower than the melting point of an oxide of the metal raw material, the oxide ceramic being produced by oxidation of the metal raw material, wherein a raw material containing a second component in addition to the main component is placed between the first member and the second member in the joining step, the second component being at least one of Li, Na, K, Ga, Si, Zr, Ti, Sn, Nb, Sb, and Ta, and wherein the oxide ceramic joint has a porosity in the range of 5% to 70% by volume.

8. The method for producing a joined body according to claim 7, wherein the multilayer body is fired at a temperature in the range of 400° C. to 900° C. in the joining step.

9. The method for producing a joined body according to claim 7, wherein a raw material containing a second component in addition to the main component is placed between the first member and the second member in the joining step, the second component being at least one of Li, Na, K, Ga, Si, Zr, Ti, Sn, Nb, Sb, and Ta.

10. The method for producing a joined body according to claim 7, wherein the first member and the second member, the difference of thermal expansion coefficient therebetween is 4.0 ppm/K or more, are used in the joining step.

* * * * *